(12) United States Patent
Takahashi et al.

(10) Patent No.: US 9,120,913 B2
(45) Date of Patent: Sep. 1, 2015

(54) ELASTIC COMPOSITE MATERIAL AND MOLD PRODUCT USING THE SAME

(71) Applicant: Hitachi Metals, Ltd., Tokyo (JP)

(72) Inventors: Kei Takahashi, Sendai (JP); Osamu Murakami, Sendai (JP); Mika Hayashi, Sendai (JP); Kazuo Hokkirigawa, Sendai (JP); Takeshi Yamaguchi, Sendai (JP); Kei Shibata, Sendai (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/041,307

(22) Filed: Sep. 30, 2013

(65) Prior Publication Data

US 2015/0094399 A1    Apr. 2, 2015

(51) Int. Cl.
*C08K 7/24* (2006.01)
*C08L 19/00* (2006.01)

(52) U.S. Cl.
CPC .. *C08K 7/24* (2013.01); *C08L 19/00* (2013.01)

(58) Field of Classification Search
CPC ................................ C08K 7/24; C08L 19/00
USPC .......................................... 524/495; 523/218
See application file for complete search history.

(56) References Cited

U.S. PATENT DOCUMENTS

| 5,916,499 A | 6/1999 | Murayama et al. |
| 2003/0179963 A1 | 9/2003 | Hokkirigawa et al. |
| 2003/0183973 A1 | 10/2003 | Hokkirigawa et al. |
| 2003/0220421 A1 | 11/2003 | Hokkirigawa et al. |
| 2003/0229161 A1* | 12/2003 | Hokkirigawa et al. ......... 524/15 |
| 2004/0013333 A1 | 1/2004 | Hokkirigawa et al. |
| 2004/0258334 A1 | 12/2004 | Hokkirigawa et al. |
| 2005/0032939 A1 | 2/2005 | Hokkirigawa et al. |

FOREIGN PATENT DOCUMENTS

| JP | 2003-253132 A | 9/2003 |
| JP | 2004-060777 A | 2/2004 |
| JP | 2004-108499 A | 4/2004 |
| JP | 2006-063182 A | 3/2006 |

OTHER PUBLICATIONS

Japanese Office Action dated Jun. 19, 2015 with an English translation.

* cited by examiner

*Primary Examiner* — James J Seidleck
*Assistant Examiner* — Deve E Valdez
(74) *Attorney, Agent, or Firm* — McGinn IP Law Group, PLLC

(57) ABSTRACT

An elastic composite material containing a base polymer of a simple substance or a mixture of rubber or thermoplastic elastomer as a base material, and a hard porous carbon material containing carbide of defatted bran and carbide of phenolic resin. The hard porous carbon material is added in a ratio of 200 parts or more by weight relative to 100 parts by weight of the base polymer.

19 Claims, No Drawings

ELASTIC COMPOSITE MATERIAL AND MOLD PRODUCT USING THE SAME

The present application is based on Japanese patent application No. 2012-155554 filed on Jul. 11, 2011, the entire content of which are incorporated herein by reference.

BACKGROUND OF THE INVENTION

1. Field of the Invention

The present invention relates to an elastic composite material and a mold product using the same, more particularly, to an elastic composite material having both the coefficient of friction equivalent to that of fluorine resin and the specific wear rate equivalent to that of ultra-high molecular weight polyethylene while having rubber elasticity.

2. Description of the Related Art

Conventionally in the field of industrial sheets, especially for applications requiring a lower coefficient of friction as compared with rubber monolayer sheets, the composite sheets comprising a rubber layer and a layer of fluorine resin such as PTFE (polytetrafluoroethylene) or a layer of ultra-high molecular weight polyethylene with the molecular weight of 1,000,000 or more which is laminated on the rubber layer have been widely used. These composite sheets are excellent in elasticity and flexibility compared with monolayer sheets including fluorine resin or ultra-high molecular weight polyethylene. Therefore, the workability in e.g. bonding with other members is particularly improved because of the presence of the rubber layer.

However, in such industrial composite sheets, on one hand, the composite sheet comprising a fluorine resin layer has drawbacks in that the specific wear rate of the composite sheet comprising the fluorine resin layer is greater than the specific wear rate of the composite sheet comprising the ultra-high molecular weight polyethylene layer. On the other hand, the composite sheet comprising an ultra-high molecular weight polyethylene layer has drawbacks in that the coefficient of friction of the composite sheet comprising the ultra-high molecular weight polyethylene layer is greater than the coefficient of friction of the composite sheet comprising the fluorine resin layer. In addition, there is also a disadvantage in that powder material or the like which is easily charged with electricity may be adsorbed on the composite sheet by static, since the volume resistivity values of the fluorine resin and ultra-high molecular weight polyethylene are large.

In recent years, although the composite industrial sheets having all the characteristics of low friction, wear resistance, electrical conductivity and softness (flexibility) have been demanded in order to apply such composite sheets for the use such as sticking resistance (for nonstick material), the industrial sheets satisfying all the above characteristics have not been achieved yet.

On the other hand, as a material with low coefficient of friction and excellent abrasion resistance, defatted bran ceramics (e.g. trade name "RB ceramics" of Sanwa Yushi Kabushiki Kaisha) which is a porous carbon material produced by kneading defatted bran such as defatted rice bran or defatted wheat bran with thermosetting resin, and the kneaded mixture has been remarked. For example, JP-A2003-253132 and JP-A 2004-108499 disclose the low friction synthetic resin composite material comprising fine particles of "RB ceramics" dispersed in synthetic resin, respectively.

SUMMARY OF THE INVENTION

However, such a composite material relates only to the synthetic resin composite material and has not yet achieved the rubber elasticity comparable to the rubber layer.

As regard to this point, e.g., JP-A2006-63182 discloses, as a rubber composite material having both low hardness and low coefficient of friction, a rubber roller comprising 5 to 100 parts by weight of RB ceramics, which is added relative to 100 parts by weight of a base polymer consisting of rubber. There is still a room for improvement in the rubber composite material disclosed by JP-A 2006-63182.

In other words, such a rubber composite material cannot be applied to a nonstick material for which lower friction characteristics and higher abrasion resistance are required as compared with the conventional products. More specifically, in order to apply the rubber composite material to the nonstick material, the rubber composite material preferably has specific wear rate of less than $10^{-6}$ mm$^2$/N which is substantially equal to the specific wear rate of ultra-high molecular weight polyethylene and coefficient of friction of 0.4 or less which is substantially equal to the coefficient of friction of fluorine resin. At present the composite material which satisfies the aforementioned friction characteristics has not been achieved yet.

Accordingly, it is an object of the present invention to provide an elastic composite material and a mold product using the same, which can provide both excellent low friction characteristics and excellent abrasion resistance that are required in the use application for the nonstick material in the industrial field, and can suppress the sticking of powder material or the like which is easily charged with electricity by virtue of electrical conductivity, without compromising the flexible characteristics of the base elastic material.

According to a feature of the invention, an elastic composite material comprises:

a base polymer comprising a simple substance or a mixture of rubber or thermoplastic elastomer as a base material, and a hard porous carbon material containing carbide of defatted bran and carbide of phenolic resin, in which the hard porous carbon material is added in a ratio of 200 parts or more by weight relative to 100 parts by weight of the base polymer.

According to another feature of the invention, a mold product is formed of the elastic composite material.

The mold product may comprise coefficient of friction of less than 0.4 and specific wear rate of less than $10^{-6}$ mm$^2$/N.

The mold product may comprise volume resistivity value of less than $10^5$ Ω·cm.

Effects of the Invention

The elastic composite material according to the present invention provides all the excellent low friction characteristics, abrasion resistance and electrical conductivity, without compromising the flexible characteristics of elastomer as the base material by the effect of the RB ceramics. Therefore, the elastic composite material according to the present invention can be utilized as nonstick material having the characteristics of the composite sheet comprising rubber and fluorine resin or high molecular weight polyethylene.

Further, the flame retardancy can be added by adding the flame retardant to the elastic composite material, so that such an elastic composite material is also applicable to a vehicle member or architectural member for which the flame retardant raw material is required. Still further, appropriate agents such as antimicrobial agent may be added as well as the flame retardant to the elastic composite material, thereby desired characteristics can be added similarly to general elastomers.

DETAILED DESCRIPTION OF THE PREFERRED EMBODIMENT

Next, a preferred embodiment of the present invention will be described in more detail.

Summary of the Embodiment

An elastic composite material in one embodiment according to the present invention comprises a base polymer comprising a simple substance or a mixture of rubber or thermoplastic elastomer as a base material, and a hard porous carbon material containing carbide of defatted bran and carbide of phenolic resin, in which the hard porous carbon material is added in a ratio of 200 parts or more by weight relative to 100 parts by weight of the base polymer.

(Hard Porous Carbon Material)

In the present application, so-called "RB ceramics" (Rice Bran ceramics) is used as an additive material. The so-called "RB ceramics" is a hard porous carbon material with several kinds of pores, which comprises carbide of defatted bran (soft amorphous carbon) i.e. carbide of rice bran, wheat bran or the like, and glassy carbon (hard amorphous carbon) which is carbide of phenolic resin. Hereinafter, "RB ceramics" is also called as "hard porous carbon material containing carbide of defatted bran and carbide of phenolic resin". The so-called "RB ceramics" is provided with high hardness, low friction characteristics, low abrasion characteristics, and electrical conductivity. As to the method for producing porous carbon material product using the carbide of defatted bran, Murayama et al reported the concrete method in U.S. Pat. No. 5,916,499.

(Base Polymer)

For the elastomer constituting the base polymer, rubber, thermoplastic elastomer or the like may be used.

For the rubber, natural rubber, isoprene rubber, ethylene-propylene rubber, chlorinated polyethylene rubber, butadiene rubber, chloroprene rubber, chlorosulfonated polyethylene rubber, styrene-butadiene rubber, isobutylene-isoprene rubber, acrylonitrile-butadiene rubber, acrylic rubber, silicone rubber, fluorine rubber, urethane rubber, epichlorohydrin rubber or the like may be used. The mixture of these rubbers may be also used.

Here, since the "RB ceramics" is added to the base polymer, it is preferable to use ultra-high molecular weight type base polymer to which a large amount of additives can be added. Further, ethylene-propylene rubbers are more preferable, since a many kinds of ultra-high molecular weight type ethylene-propylene rubbers are available.

For the thermoplastic elastomer, styrene-based thermoplastic elastomer (TPS), olefin-based thermoplastic elastomer (TPO), vinyl chloride-based thermoplastic elastomer (TRW), polyester-based thermoplastic elastomer (TPEE), polyurethane-based thermoplastic elastomer (TPU), nylon-based thermoplastic elastomer (TPA) or the like may be used. The mixture of these materials may be also used.

Further, the aforementioned rubber and thermoplastic elastomer may be used alone as a simple substance or as a mixture.

(Additive Amount of the RB Ceramics)

The additive amount of the RB ceramics, i.e., hard porous carbon material containing carbide of defatted bran and carbide of phenolic resin is 200 parts or more by weight relative to 100 parts by weight of the base polymer, since the effect of lowering coefficient of friction, specific wear rate and volume resistivity value is not enough if the additive amount is less than 200 parts by weight.

In this range of the additive amount, it is possible to lower coefficient of friction, specific wear rate and volume resistivity value in accordance with the increase in the additive amount of the hard porous carbon material containing carbide of defatted bran and carbide of phenolic resin. The maximum additive amount that can be added to the base polymer mainly depends on the kind, chemical structure or the like of the base polymer. Therefore, a critical (limit) additive amount that can be added to the selected base polymer is the maximum additive amount. Accordingly, the maximum additive amount of the hard porous carbon material containing carbide of defatted bran and carbide of phenolic resin varies depending on the selected base polymer, and is around 600 parts by weight relative to 100 parts by weight of the base polymer.

(Other Additives)

The elastic composite material in the present embodiment may appropriately contain, in addition to the base polymer and the hard porous carbon material containing carbide of defatted bran and carbide of phenolic resin, vulcanizing agents (crosslinking agents), vulcanizing aids (crosslinking aids), fillers, flame retardants, plasticizers, antiaging agents (antioxidants), stabilizers, colorants, processing aids and the like.

For the vulcanizing agents, sulfur, sulfur compounds, inorganic vulcanizing agents other than sulfur, polyamines, resin vulcanizing agents, oximes, nitroso compounds, triazine vulcanizing agents, peroxide vulcanizing agents, or the like may be used. The simple substance or the combination of two or more of these substances may be added as the vulcanizing agent.

For the peroxide vulcanizing agent, diacyl peroxides such as dibenzoyl peroxide, dicumyl peroxides, di-t-butyl peroxides, monoperoxy compounds (peroxy esters such as t-butyl peroxy acetate, t-butyl peroxy isopropylcarbonate, and t-butyl peroxy benzoate, or the like), diperoxy compounds (2,5-dimethyl-2,5-di-(t-butyl peroxy)-hexyne-3,2,5-dimethyl-2, 5-di-(t-butylperoxy)-hexane, 1,4-bis-(t-butylperoxy-isopropyl)benzene, 1,3-bis-(t-butylperoxy-isopropyl) benzene, 2,5-dimethyl-2,5-di-(benzoyl peroxy)-hexane, or the like), or the like may be used. The simple substance or the combination of two or more of these substances may be added as the peroxide vulcanizing agent.

The vulcanizing aids may be used together with the vulcanizing agent for the vulcanizing process. For the vulcanizing aids, metal oxides, metal carbonates, amines, guanidine-based aids, aldehyde amine-based aids, aldehyde ammonia-based aids, thiazole-based aids, sulfenamide-based aids, thiourea-based aids, thiuram-based aids, dithiocarbamate-based aids, xanthate-based aids, allylic compounds, maleimides, methacrylates, divinyl compounds or the like may be used. The simple substance or the combination of two or more of these substances may be added as the vulcanizing aids.

For the filler, organic fillers or inorganic fillers may be used. The organic filler or the inorganic filler may be used alone or in combination.

For the inorganic filler, carbon-based fillers, silicate fillers, magnesium carbonate-based fillers, calcium carbonate-based fillers, magnesium silicate-based fillers, aluminum silicate-based fillers, aluminum oxide-based fillers, aluminum hydroxide-based fillers, magnesium hydroxide-based fillers, barium sulfate-based fillers, silicon carbide-based fillers, glass-based fillers, metal powders, high-strength fibers, or the like may be used.

For the organic filler, polyethylene (PE), polypropylene (PP), polystyrene (PS), acrylonitrile-butadiene-styrene resin (ABS resin), polycarbonate (PC), polyacetal (POM), polyoxymethylene, polyester, polyamide (PA), polyamide-imide (PAI), polyphenylene ether (PPE), polyphenylene sulfide (PPS), polyether ketone (PEK), polyetheretherketone (PEEK), polyarylate, polyimide (PI), engineering plastic-based resin (liquid crystal polymer, etc.), chlorinated resins (polyvinyl chloride, chlorinated polyethylene, etc.), fluorine-based resin (polyvinvlidene fluoride (PVDF), ethylene-tetrafluoroethylene (ETFE), polytetrafluoroethylene (PTFE), etc.), silicone-based resin, high-strength fibers, cellulose fibers, etc. may be used.

For the flame retardants, boron-based compounds, antimony-based compounds, molybdenum-based compounds, zirconium-based compounds, tin-based compounds, guanidine-based compounds, metal hydroxides, phosphorus-based compounds, halogen-based compounds, nitrogen-based compounds, etc. may be used. The simple substance or the combination of two or more of these substances may be added as the flame retardant.

The total additive amount of the vulcanizing agent and the vulcanizing aid is in a ratio of preferably 3 to 25 parts by weight, and more preferably 5 to 20 parts by weight, relative to 100 parts by weight of the base polymer.

The additive amount of the filler is in a ratio of, preferably 10 to 200 parts by weight, and more preferably 20 to 100 parts by weight, relative to 100 parts by weight of the base polymer.

The additive amount of the flame retardant is in a ratio of, preferably 10 to 60 parts by weight, and more preferably 20 to 50 parts by weight, relative to 100 parts by weight of the base polymer.

The total additive amount of the vulcanizing agent, vulcanizing aid, filler, flame retardant and processing aid is in a ratio of, 30 to 300 parts by weight, preferably 40 to 250 parts by weight, and more preferably 50 to 200 parts by weight, relative to 100 parts by weight of the base polymer.

By using the aforementioned compounding ratios, the elastic composite material in the present embodiment has, in the case of using e.g. ethylene-propylene rubber-based polymer, low friction (i.e. coefficient of friction is less than 0.4), low wear rate (i.e. specific wear rate is $4 \times 10^{-7}$ (mm$^2$/N) or less), and electrical conductivity (i.e. volume resistivity value is less than $10^5$ ($\Omega \cdot$cm)).

The elastic composite material in the present embodiment is suitable to the applications for sliding materials in the portion for which the elasticity and flexibility are required, nonstick materials, or alternative materials of ultra-high molecular weight polyethylene or fluorine resin.

The use application of the elastic composite material in the present embodiment is however not limited to the nonstick purpose instead of the composite sheet of rubber and ultra-high molecular weight polyethylene or fluorine resin. In other words, such elastic composite materials can be processed into not only sheet-like mold products but also mold products with any shape. Further, such elastic composite materials can be bonded to the other materials or combined with different materials, so that a wide range of applications is expected.

Still further, the elastic composite material in the present embodiment can be provided with desired additional characteristics by adding compounding agents, such as flame retardants, antimicrobial agents, and perfuming agents, in the same manner as general thermoplastic elastomers and general rubbers.

EXAMPLES

Next, Examples of the present invention will be explained below in comparison with Comparative Example.

TABLE 1

| | | | | | | | | Comparative Example |
|---|---|---|---|---|---|---|---|---|
| | | | | Examples | | | | |
| | | | 1 | 2 | 3 | 4 | 5 | 1 |
| Compounding Ratio of Composition of Elastic composite material | Rubber | Ethylene Propylene | 60.00 | 100.00 | 100.00 | 100.00 | 100.00 | 100.00 |
| | | Isobtylene-isoprene | 40.00 | | | | | |
| | RB ceramics*[1] | | 207.73 | 274.70 | 281.44 | 315.00 | 412.05 | 185.50 |
| | Fillers | Carbon black | 35.00 | 60.00 | 2.00 | 10.00 | 60.00 | |
| | | Silicate | | 40.00 | | 40.00 | 40.00 | |
| | | Aluminum silicate | 23.00 | | | | | |
| | | Borosilicate glass | | | | 18.00 | | |
| | | Aluminum hydroxide | | | 60.00 | | | |
| | | Magnesium hydroxide | | | 100.00 | | | |
| | Flame retardant | | 25.50 | 50.00 | | 34.30 | 50.00 | |
| | Vulcanizing agent and Vulcanizing aid | | 11.50 | 16.70 | 17.96 | 16.70 | 16.70 | 16.70 |
| | Processing aid | | 10.40 | 8.00 | 2.60 | 9.00 | 8.00 | 7.00 |
| Characteristics | Coefficient of friction | | 0.38 | 0.36 | 0.28 | 0.21 | 0.19 | 0.59 |
| | Specific wear rate [mm$^2$/N] | | — | $3.80 \times 10^{-7}$ | $3.85 \times 10^{-7}$ | $2.17 \times 10^{-7}$ | $1.70 \times 10^{-7}$ | $1.29 \times 10^{-6}$ |
| | Electrical conductivity | | ○ | ○ | ○ | ○ | ○ | X |
| | Flame retardancy | | ◎ | ◎ | ○ | ◎ | ◎ | X |

(Amount unit: parts by weight)
*[1] "RB ceramics" made by Sanwa Yushi Kabusihiki Kaisha Table 1 shows the compounding ratio of the composition of each elastic composite material as well as the measurement results of coefficient of friction and specific wear rate and the evaluation results of electrical conductivity and flame retardancy of the mold product of each elastic composite material, in Examples 1 to 5 and Comparative Example 1.

Example 1

Relative to the base polymer composed of 100 parts by weight of rubber (ethylene propylene: 60 parts by weight, isobutylene-isoprene: 40 parts by weight), 207.73 parts by weight of RB ceramics, 58 parts by weight of fillers in total (carbon black: 35 parts by weight, aluminum silicate: 23 parts by weight), 25.5 parts by weight of flame retardant, 11.5 parts by weight of vulcanizing agent and vulcanizing aid in total, and 10.4 parts by weight of processing aid were added respectively in order to provide a mixture. The resulting mixture was kneaded using a kneader (8 inches roll) to prepare an elastomeric composite material.

Example 2

Relative to the base polymer composed of 100 parts by weight of rubber (ethylene propylene: 100 parts by weight), 274.7 parts by weight of RB ceramics, 100 parts by weight of fillers in total (carbon black: 60 parts by weight, silicate: 40 parts by weight), 50 parts by weight of flame retardant, 16.7 parts by weight of vulcanizing agent and vulcanizing aid in total, and 8 parts by weight of processing aid were added respectively in order to provide a mixture. The resulting mixture was kneaded using a kneader (8 inches roll) to prepare an elastomeric composite material.

Example 3

Relative to the base polymer composed of 100 parts by weight of rubber (ethylene propylene: 100 parts by weight), 281.44 parts by weight of RB ceramics, 162 parts by weight of fillers in total (carbon black: 2 parts by weight, aluminum hydroxide: 60 parts by weight, magnesium hydroxide: 100 parts by weight), 17.96 parts by weight of vulcanizing agent and vulcanizing aid in total, and 2.6 parts by weight of processing aid were added, respectively, to provide a mixture. The resulting mixture was kneaded using a kneader (8 inches roll) to prepare an elastomeric composite material.

Example 4

Relative to the base polymer composed of 100 parts by weight of rubber (ethylene propylene: 100 parts by weight), 315 parts by weight of RB ceramics, 68 parts by weight of fillers in total (carbon black: 10 parts by weight, aluminum silicate: 40 parts by weight, borosilicate glass: 18 parts by weight), 34.3 parts by weight of flame retardant, 16.7 parts by weight of vulcanizing agent and vulcanizing aid in total, and 9 parts by weight of processing aid were added, respectively, to provide a mixture. The resulting mixture was kneaded using a kneader (8 inches roll) to prepare an elastomeric composite material.

Example 5

Relative to the base polymer composed of 100 parts by weight of rubber (ethylene propylene: 100 parts by weight), 412.05 parts by weight of RB ceramics, 100 parts by weight of fillers in total (carbon black: 60 parts by weight, silicate: 40 parts by weight), 50 parts by weight of flame retardant, 16.7 parts by weight of vulcanizing agent and vulcanizing aid in total, and 8 parts by weight of processing aid were added, respectively, to provide a mixture. The resulting mixture was kneaded using a kneader (8 inches roll) to prepare an elastomeric composite material.

Comparative Example 1

Relative to the base polymer composed of 100 parts by weight of rubber (ethylene propylene: 100 parts by weight), 185.5 parts by weight of RB ceramics, 16.7 parts by weight of vulcanizing agent and vulcanizing aid in total, and 7 parts by weight of processing aid were added, respectively, to provide a mixture. The resulting mixture was kneaded using a kneader (8 inches roll) to prepare an elastomeric composite material.

Each elastic composite material obtained by Examples 1 to 5 and Comparative Example 1 was vulcanized by pressure-vulcanizing at 165 degrees Celsius by using a mold, to prepare a 2 mm-thick sheet-like mold product of the elastic composite material (vulcanized sheet).

In order to evaluate the characteristics of the prepared mold product of the elastic composite material, coefficient of friction, specific wear rate, electrical conductivity, and flame retardancy were measured.

(Measurement of the Coefficient of Friction and Specific Wear Rate)

For each sample, the coefficient of friction and specific wear rate of the mold product of the elastic composite material were measured with no lubrication at a sliding velocity of 1 m/s, with the use of a torque friction resistance measuring machine "TYPE20" of Shinto Scientific Co., Ltd.

The coefficient of friction was calculated based on the contact torque when surface pressure is 3.92 N/cm$^2$ in the same sliding material. When the measured coefficient of friction is less than 0.4, the sample is evaluated to have "low friction" equivalent to that of fluorine resin.

Specific wear rate (V/(W·L) was calculated by dividing wear amount (V) by sliding load (W) and sliding distance (L), with the use of bearing balls SUJ2 φ8 mm (HS G4805). When the calculated specific wear rate is less than $10^{-6}$ (mm$^2$/N), the sample is evaluated to have the wear resistance equivalent to that of ultra-high molecular weight polyethylene.

(Measurement of Electrical Conductivity)

The electrical conductivity was evaluated based on the volume resistivity value of the mold product of each elastic composite material. The volume resistivity value of the mold product of elastic composite material was measured by parallel plate electrode method (or dual-ring electrode method) compliant to HS K6271. When the volume resistivity value is less than $10^5$ (Ω·cm), the result is considered as "◯" (electrically conductive), and when the volume resistivity value is not less than $10^5$ (Ω·cm), the result is considered as "X" (semi-conductive or electrically insulative).

(Flame Retardancy)

Flame retardancy was evaluated by the burn test of the mold product of each elastic composite material. The burn test was carried out by applying the flame to the mold product of elastic composite material with simulating UL94 vertical burn test, and the state of burning was observed visually. When the mold product of the elastic composite material was not burned, it is evaluated as "◉" ("non-flammable"). When the mold product was naturally extinguished after burning, it is evaluated as "◯" ("self-extinguishing"). When the mold product continued to burn and was not extinguished naturally, it was evaluated as "X" ("not self-extinguishing").

It will be noted from Table 1 that the coefficients of friction of the mold products of the respective elastic composite materials in Examples 1 to 5 were ranging from 0.19 to 0.38, and that the low friction equivalent to that of fluorine resin was achieved. Further, for all samples in Examples 1 to 5, the specific wear rates were on the order of $10^{-7}$ (mm$^2$/N), so that the abrasion resistance equivalent to that of ultra-high molecular weight polyethylene was achieved. Still further, for all samples in Examples 1 to 5, the volume resistivity value was less than $10^5$ (Ω·cm), so that the electrical conductivity was excellent as compared with those of ultra-high molecular weight polyethylene and fluorine resin.

In addition, the flame retardant was added to the elastic composite materials in Examples 1 to 5. The effect of adding the flame retardant was confirmed based on the evaluation of the flame retardancy.

For the elastic composite materials in Examples 1, 2, 4 and 5, the flame retardant ranging from 25.5 parts by weight to 50 parts by weight was added, and the samples were evaluated as "non-flammable" in the burst test of the mold product of elastic composite material. For the mold product of elastic composite material in Example 3, aluminum hydroxide (60 parts by weight) and magnesium hydroxide (100 parts by weight) were added as fillers which also serve as flame retardants, and the sample exhibited the self-extinguishing property in the burn test of the mold product of elastic composite material.

For the elastic composite material in Comparative Example 1, a compounding ratio of RB ceramics is less than 200 parts by weight, and less than the standard amount (200 parts or more by weight). Therefore, the vulcanized sheet of elastic composite material in Comparative Example 1 has the coefficient of friction of 0.59, so that the low friction equivalent to that of the fluorine resin was not achieved. The specific wear rate was on the order of $10^{-6}$ (mm$^2$/N), so that the abrasion resistance equivalent to that of ultra-high molecular weight polyethylene was not achieved. Further, the volume resistivity value was not less than $10^5$ ($\Omega \cdot$cm), so that the electrical conductivity was insufficient.

Still further, for the elastic composite material in Comparative Example 1, the flame retardant was not added. Therefore, in the burn test, the mold product of the elastic composite material was easily burned and did not exhibit self-extinguishing property, so that the flame retardancy was not achieved.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A molded product having rubber elasticity produced by molding and vulcanization of an elastic composition, the elastic composition comprising:
    a base polymer comprising a rubber or a thermoplastic elastomer or a mixture thereof; and
    a hard porous carbon material comprising a carbide of a defatted bran and a carbide of a phenolic resin,
    wherein the hard porous carbon material is added in a ratio of 200 parts or more by weight relative to 100 parts by weight of the base polymer.

2. The molded product according to claim 1, wherein the molded product comprises a coefficient of friction of less than 0.4 and a specific wear rate of less than $10^{-6}$ mm$^2$/N.

3. The molded product according to claim 1, wherein the molded product comprises a volume resistivity value of less than $10^5$ $\Omega \cdot$cm.

4. The molded product according to claim 2, wherein the molded product comprises volume resistivity value of less than $10^5$ $\Omega \cdot$cm.

5. The molded product according to claim 1, wherein the hard porous carbon material is added at a ratio of 600 parts or less by weight per 100 parts by weight of the base polymer.

6. The molded product according to claim 1, wherein the rubber comprises one of natural rubber, isoprene rubber, ethylene-propylene rubber, chlorinated polyethylene rubber, butadiene rubber, chloroprene rubber, chlorosulfonated polyethylene rubber, styrene-butadiene rubber, isobutylene-isoprene rubber, acrylonitrile-butadiene rubber, acrylic rubber, silicone rubber, fluorine rubber, urethane rubber, or epichlorohydrin rubber.

7. The molded product according to claim 1, wherein the rubber comprises an ethylene-propylene rubber.

8. The molded product according to claim 1, wherein the thermoplastic elastomer comprises one of styrene-based thermoplastic elastomer (TPS), olefin-based thermoplastic elastomer (TPO), vinyl chloride-based thermoplastic elastomer (TPVC), polyester-based thermoplastic elastomer (TPEE), polyurethane-based thermoplastic elastomer (TPU), and nylon-based thermoplastic elastomer (TPA).

9. The molded product according to claim 1, wherein the elastic composition further comprises:
    a vulcanizing agent comprising at least one member selected from the group consisting of sulfur, a sulfur compound, an inorganic vulcanizing agent other than sulfur, a polyamine, a resin vulcanizing agent, an oxime, a nitroso compound, a triazine vulcanizing agent and a peroxide vulcanizing agent.

10. The molded product according to claim 9, wherein the peroxide vulcanizing agent comprises at least one member selected from the group consisting of a diacyl peroxide, a dicumyl peroxide, a di-t-butyl peroxide, a monoperoxy compound and a diperoxy compound.

11. The molded product according to claim 9, wherein the elastic composition further comprises:
    a vulcanizing aid comprising at least one member selected from the group consisting of a metal oxide, a metal carbonate, an amine, a guanidine-based aid, an aldehyde amine-based aid, an aldehyde ammonia-based aid, a thiazole-based aid, a sulfenamide-based aid, a thiourea-based aid, a thiuram-based aid, a dithiocarbamate-based aid, a xanthate-based aid, an allylic compound, a maleimide, a methacrylate and a divinyl compound.

12. The molded product according to claim 11, wherein a total additive amount of the vulcanizing agent and the vulcanizing aid is in a ratio of 3 to 25 parts by weight relative to 100 parts by weight of the base polymer.

13. The molded product according to claim 1, wherein the elastic composition further comprises:
    a filler, an additive amount of the filler being in a ratio of 10 to 200 parts by weight, relative to 100 parts by weight of the base polymer.

14. The molded product according to claim 13, wherein the filler comprises an inorganic filler including a member selected from the group consisting of a carbon-based filler, a silicate filler, a magnesium carbonate-based filler, a calcium carbonate-based filler, a magnesium silicate-based filler, an aluminum silicate-based filler, an aluminum oxide-based filler, an aluminum hydroxide-based filler, a magnesium hydroxide-based filler, a barium sulfate-based filler, a silicon carbide-based filler, a glass-based filler, a metal powder and a high-strength fiber.

15. The molded product according to claim 13, wherein the filler comprises an organic filler including a member selected from the group consisting of polyethylene (PE), polypropylene (PP), polystyrene (PS), acrylonitrile-butadiene-styrene resin (ABS resin), polycarbonate (PC), polyacetal (POM), polyoxy-methylene, polyester, polyamide (PA), polyamide-imide (PAD, polyphenylene ether (PPE), polyphenylene sulfide (PPS), polyether ketone (PEK), polyetheretherketone (PEEK), polyarylate, polyimide (PI), an engineering plastic-based resin, a chlorinated resin, a fluorine-based resin, a silicone-based resin, a high-strength fiber and a cellulose fiber.

16. The molded product according to claim 1, wherein the elastic composition further comprises:
    a flame retardant including at least one member selected from the group consisting of a boron-based compound, an antimony-based compound, a molybdenum-based compound, a zirconium-based compound, a tin-based compound, a guanidine-based compound, a metal hydroxide, a phosphorus-based compound, a halogen-based compound and a nitrogen-based compound.

17. The molded product according to claim 16, wherein an additive amount of the flame retardant is in a ratio of 10 to 60 parts by weight, relative to 100 parts by weight of the base polymer.

18. The molded product according to claim 1, wherein the elastic composition further comprises:
   a vulcanizing agent, a vulcanizing aid, a filler, a flame retardant and a processing aid, a total additive amount of the vulcanizing agent, vulcanizing aid, filler, flame retardant and processing aid being in a ratio of 30 to 300 parts by weight, relative to 100 parts by weight of the base polymer.

19. A method of forming a molded product, the method comprising:
   preparing an elastic composition comprising:
      a base polymer comprising at least one of a rubber and a thermoplastic elastomer; and
      a hard porous carbon material comprising a carbide of a defatted bran and a carbide of a phenolic resin, the hard porous carbon material being added in a ratio of 200 parts or more by weight relative to 100 parts by weight of the base polymer; and
   vulcanizing the elastic composition by using a mold to form the molded product having a rubber elasticity.

* * * * *